July 18, 1944.   J. A. SPRAGUE   2,353,896
PHOTOGRAPHIC SYNCHRONIZER TESTING EQUIPMENT
Filed Sept. 30, 1942   7 Sheets-Sheet 1

Fig. 1.

INVENTOR.
Joseph A. Sprague
BY
his Attorneys

July 18, 1944.  J. A. SPRAGUE  2,353,896
PHOTOGRAPHIC SYNCHRONIZER TESTING EQUIPMENT
Filed Sept. 30, 1942  7 Sheets-Sheet 2

INVENTOR.
Joseph A. Sprague
BY
his Attorneys

July 18, 1944.   J. A. SPRAGUE   2,353,896
PHOTOGRAPHIC SYNCHRONIZER TESTING EQUIPMENT
Filed Sept. 30, 1942   7 Sheets-Sheet 3

INVENTOR.
Joseph A. Sprague
BY
his Attorneys

July 18, 1944. J. A. SPRAGUE 2,353,896
PHOTOGRAPHIC SYNCHRONIZER TESTING EQUIPMENT
Filed Sept. 30, 1942 7 Sheets-Sheet 6

INVENTOR.
Joseph A. Sprague
BY
his Attorneys

July 18, 1944.   J. A. SPRAGUE   2,353,896
PHOTOGRAPHIC SYNCHRONIZER TESTING EQUIPMENT
Filed Sept. 30, 1942   7 Sheets-Sheet 7

INVENTOR.
Joseph A. Sprague
BY
his Attorneys

Patented July 18, 1944

2,353,896

UNITED STATES PATENT OFFICE 2,353,896

PHOTOGRAPHIC SYNCHRONIZER TESTING EQUIPMENT

Joseph A. Sprague, Honeoye Falls, N. Y., assignor to The Folmer Graflex Corporation, Rochester, N. Y., a corporation of Delaware Application September 30, 1942, Serial No. 460,313

12 Claims. (Cl. 234—60)

This invention relates to testing equipments for photographic flashlamp synchronizers of the electromagnetic release type.

In order that the principle of the invention may be readily understood, I have disclosed a single embodiment of my invention in the accompanying drawings, wherein—

When a flash gun or photoflash equipment is installed on a camera, it is necessary to have some means for checking the synchronization of the peak of the flash with the opening of the photographic shutter. It is also necessary to have some such equipment for checking the synchronization after any of the parts have been removed for repairs or for any other reason. There have been developed for use in well-equipped laboratories, very elaborate means for checking such equipments, but there has long been need for a simple equipment that could be used in a dark room in the field and that would give a quick visual check upon the performance of the apparatus, and if necessary make a photographic record of the performance of the camera shutter when equipped with a flash synchronizing mechanism. My invention provides an equipment that does both things in a highly satisfactory manner.

Among the objects of my invention are: to provide a synchronizer for checking the performance of a synchronizer equipment by a visual means with sufficient accuracy so that the operator will have full confidence that his synchronizing equipment and shutter will be fully synchronized; to provide a synchronizing equipment that will produce a photographic record of the performance of the synchronizing equipment and synchronization of the shutter wherewith it operates; to provide a synchronizing equipment that is simple and foolproof in operation and that can be readily operated by any one having sufficient knowledge to operate a photographic camera; to provide means for quickly attaching and holding in proper spaced relation a photographic shutter and a lens equipment mounted on a lens board; to provide a simple sensitized material holder that can be loaded with a sheet of sensitized material for providing a permanent photographic record; to provide a synchronizer testing equipment that can be folded into a small package for transportation; and to provide simple means for furnishing illumination when testing synchronization by the visual means.

Figure 1:
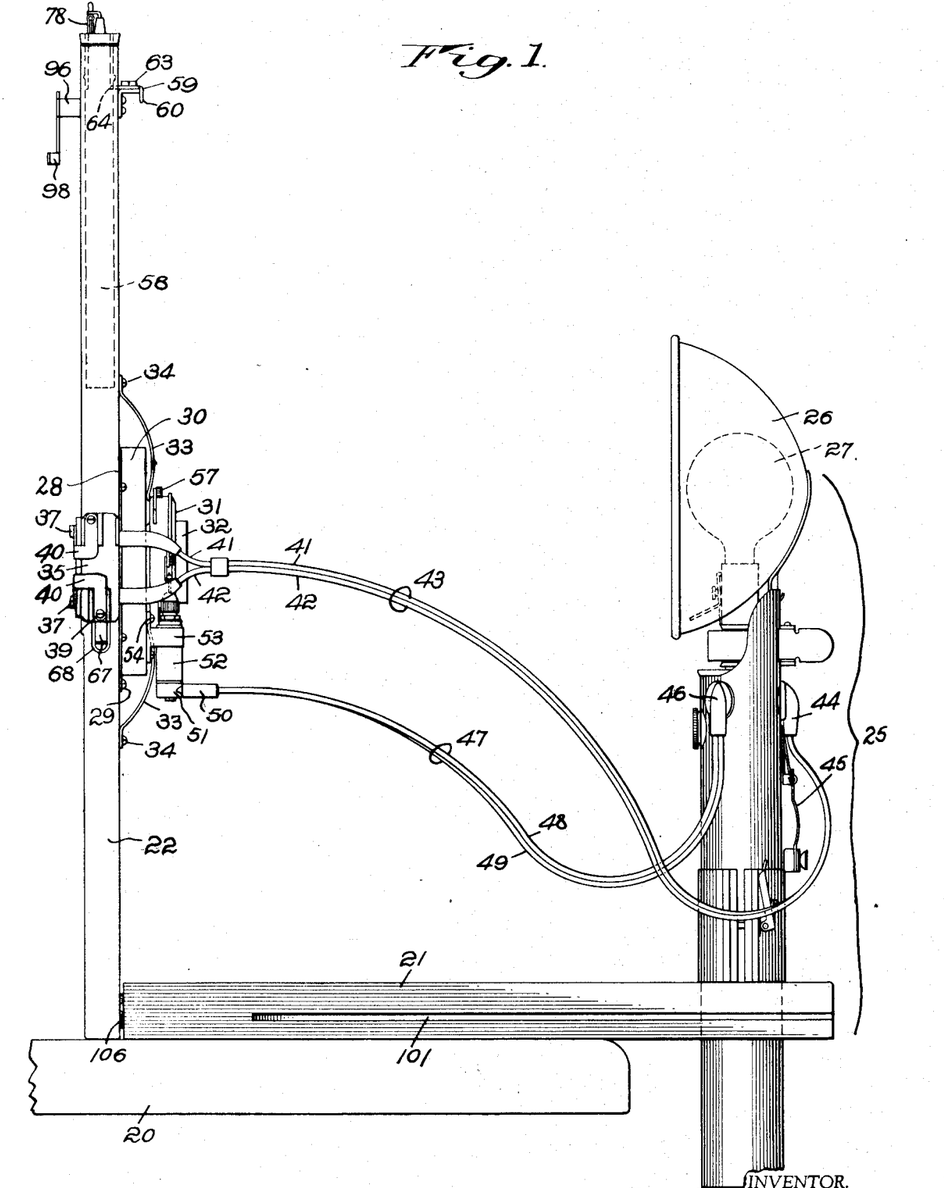
Fig. 1 is a left hand side elevation of the synchronizing equipment with a positioned synchronizer battery case provided with the usual reflector and flashlamp to be synchronized with the shutter, the mechanism being in condition for making a record test.
Figure 2:
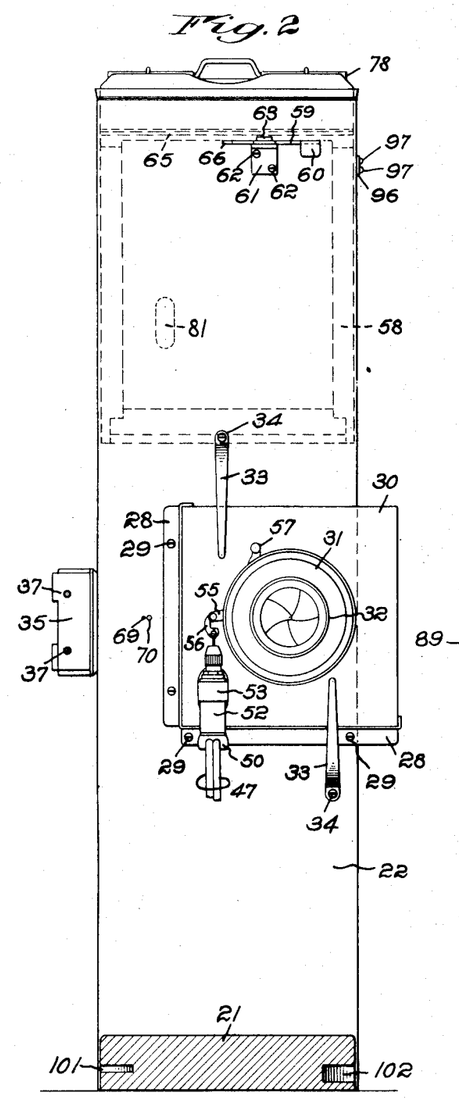
Fig. 2 is a front elevation of the synchronizer tester in condition for making a record test, with the horizontal member in transverse section, showing the shutter and lens board with the electromagnetic tripper attached thereto, the sensitized material holder or carrier being shown in dotted lines.
Figure 3:
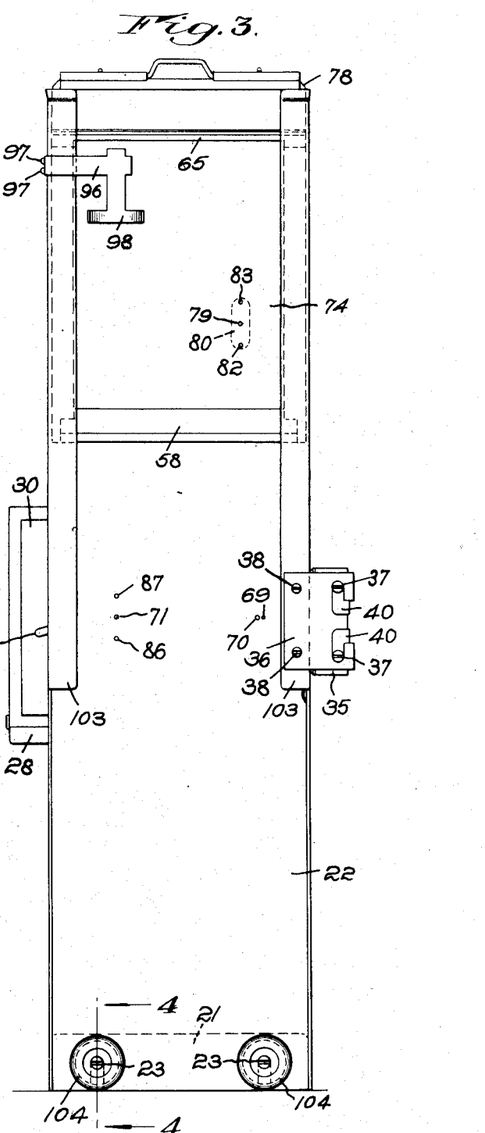
Fig. 3 is a rear elevation of Fig. 1, showing the position of the sensitized material holder or carrier prior to making a record test, the mechanism being in condition for making the same.
Figure 4:
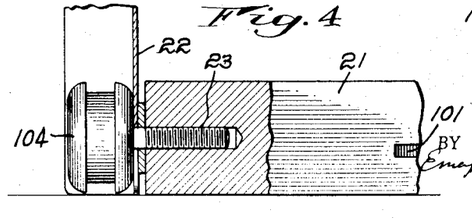
Fig. 4 is a vertical section through Fig. 3 on the line 4—4 thereof.
Figure 9:
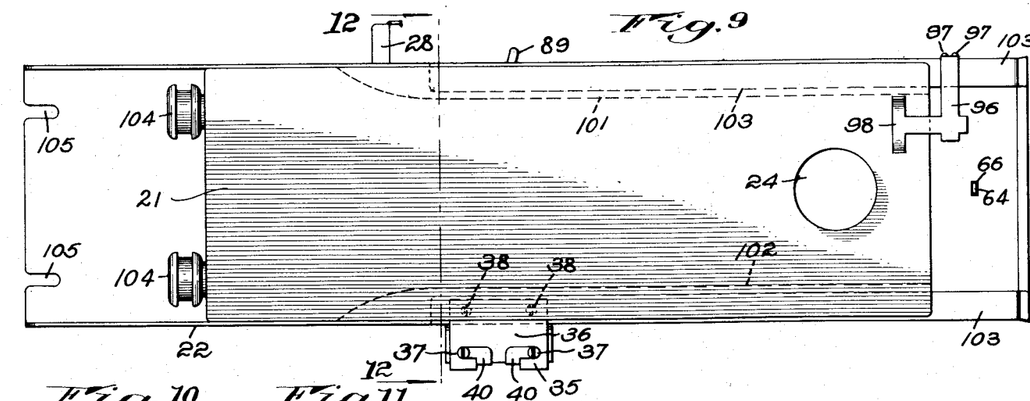
Fig. 9 is a top plan view of the synchronizer testing equipment when folded for storage or transportation.
Figures 10, 11:
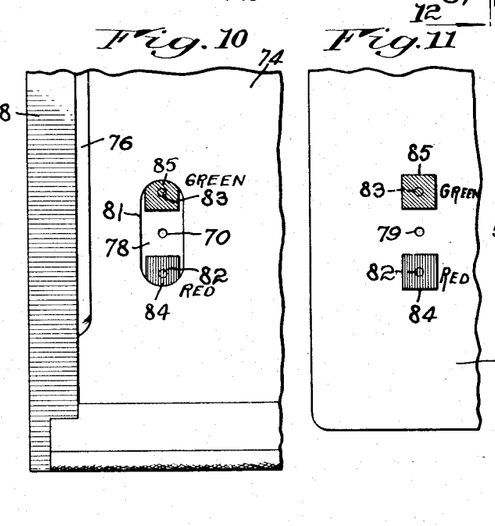
Fig. 10 is a fragmentary, rear view detail of the sensitized material holder or carrier, showing the several openings used in checking the shutter by the visual test.
Fig. 11 is a fragmentary view of one of the dark slides used when making visual tests, and showing the position of the filters thereon.
Figure 16:
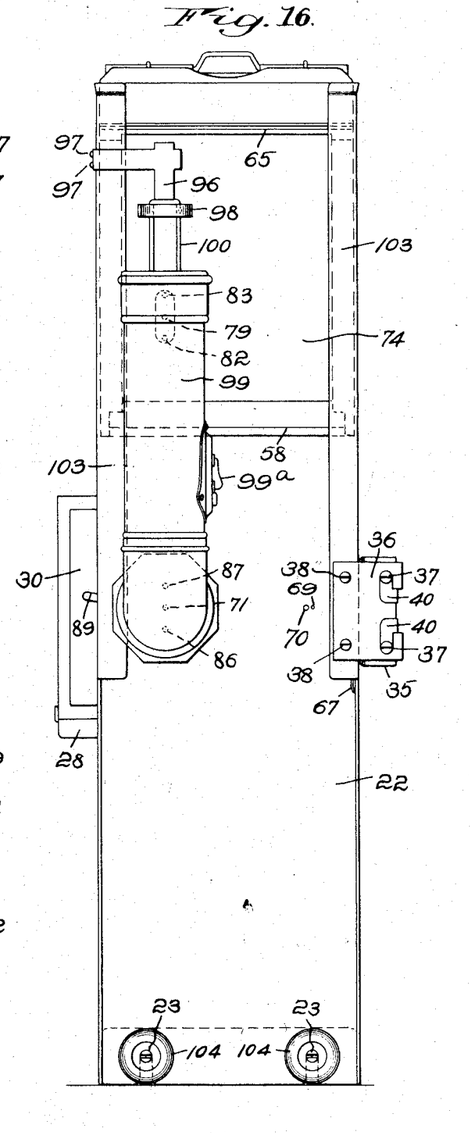
Fig. 16 is a view similar to Fig. 3, but showing the flash lamp in the position wherein the synchronizing testing equipment is in condition for making a visual test.
Figure 17:
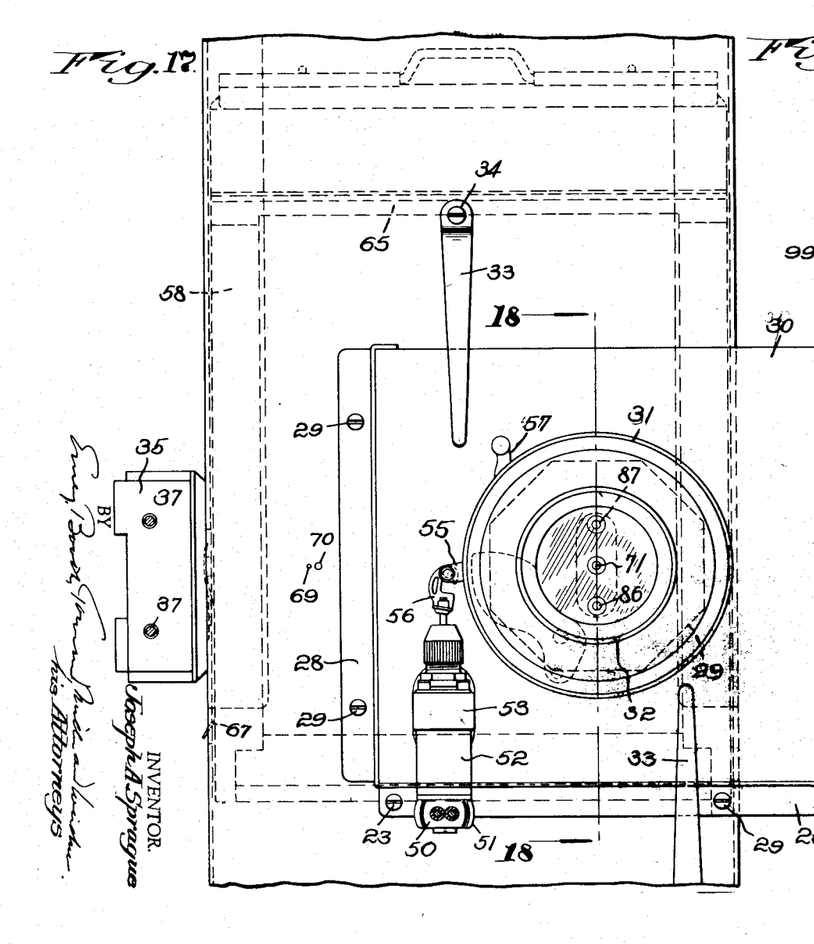
Fig. 17 is a view similar to Fig. 5, but showing the mechanism in condition for making a visual test, the shutter being in the open condition so as more clearly to show the structure thereof.

Referring first to Figs. 1, 2 and 3, the structure constituting the disclosed embodiment of my invention is mounted on a table 20 or other suitable support, upon which is positioned in a face-to-face relation therewith (being secured thereto if desired) a base supporting member 21, preferably of wood, shown as rectangular in cross section, and to which is attached a vertical support member 22 preferably of sheet metal and attached to the said base supporting member 21 by screws 23, shown in Figs. 3, 4 and 16. Fitted into a hole 24 of said member 21, as shown in Fig. 9, is a flash synchronizer battery case indicated as a whole at 25. The hole 24 is of such shape or diameter as adapts it to receive battery cases of usual diameter, or means may be provided to receive and support upon said member 21 battery cases of different diameters. If desired clamping means may be substituted for the hole 24 to hold the selected flash battery case in position.

As indicating the use of the disclosed embodiment of my invention, I have shown as an example of a synchronizer that may be tested in the testing equipment, the synchronizer that is disclosed in the patent to Oscar Steiner, No. 2,329,011, dated September 7, 1943, but it is to be understood that my invention is in no wise limited in its use to the testing of the type of synchronizer shown in said Steiner patent, as my testing equipment is intended for use in testing synchronizers differing widely in construction.

The illustrated battery case 25 is provided with an appropriate reflector 26 and a flashlamp is indicated in dotted lines at 27.

Figures 5, 6, 7, 8:
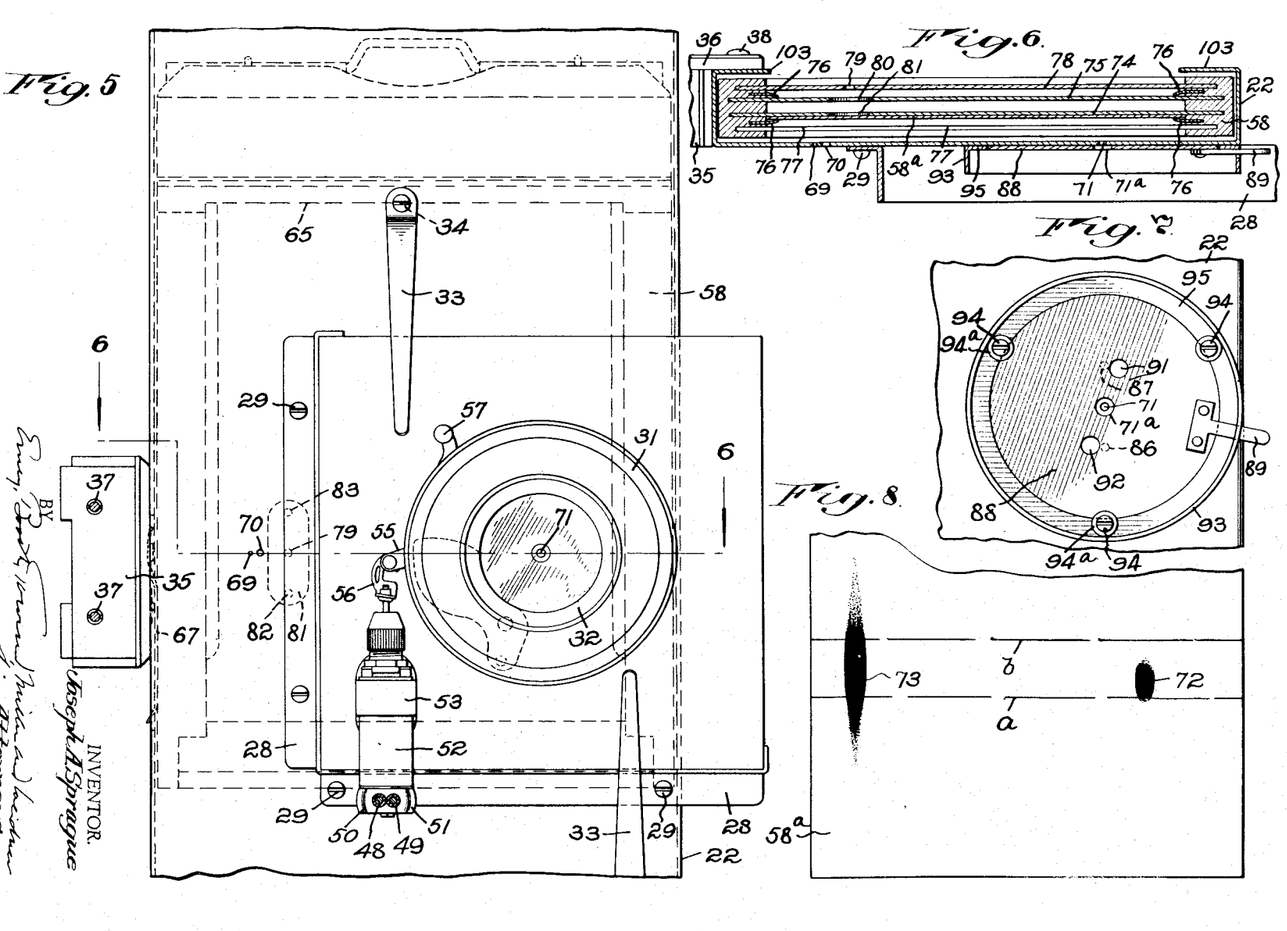
Fig. 5 is a view similar to Fig. 2, but on an enlarged scale, showing the sensitized material holder or carrier in dotted lines in position for shutter operation.
Fig. 6 is a partial horizontal section through Fig. 5 on the line 6—6 thereof, showing the parts of the sensitized material holder or carrier when a record test is being made.
Fig. 7 is a fragmentary front elevation of the light valve or gate used when selecting the type of test to be made, i. e. a visual test or a record test, the light valve being in position for making a record test.
Fig. 8 is a fragmentary view of a developed photographic sheet or chart showing both the trace produced by the photoflash lamp and the trace produced through the shutter.

A lens board receiver 28 is attached to the vertical support member 22 by screws 29, being most clearly shown in Fig. 5. As there indicated, and also in Figs. 2, 3, etc., it has fitted thereinto a lens board 30 whereon is mounted a shutter 31 having a lens 32, such lens board 30 being held in position by retaining springs 33, pivoted to the vertical support member 22 by screws 34. Also mounted upon the said vertical support member 22 is an electrical switch 35 held in position by an insulating strip 36 to which the switch 35 is secured by screws 37, 37, the said insulating strip 36 being itself held to the vertical support member 22 by screws 38, shown in Figs. 3, 12 and 16. The said switch 35 is provided with the usual contact screws 39, to which are attached a pair of bus-bars 40, terminating under the heads of screws 37, which pass through the body of the switch 35 and serve as contacts to which are attached wires 41, 42 making up a cable 43. The opposite end of said cable 43 is provided with a connecting plug 44 attachable to a series outlet of the battery case 25. In the disclosed embodiment of my invention, the series outlet to which the connecting plug 44 is applied has been uncovered by swinging downward the battery case switch 45 out of functioning position, as shown in Fig. 1. In making a test the switch 35 is substituted in function for the switch 45 in the manner described.

Also shown as attached for testing purposes to the battery case 25 is a second electrical connecting plug 46 fitted into any one of the parallel outlets of the battery case 25, said plug 46 being attached to a cable 47 consisting of the wires 48, 49. The opposite end of the cable 47 is provided with an electrical plug 50 fitted into a to-and-fro or axially movable element 51 of an electromagnetic tripper 52 held to the lens board 30 by a tripper bracket 53 itself attached to said lens board by screws 54, 54.

Referring particularly to Figs. 2 and 3 and also to Figs. 1 and 6, the said electromagnetic tripper 52 is in mechanical connection with a shutter release arm 55 by means of a connecting link 56 or in any other suitable or desired manner. The shutter 31 is provided with the usual set lever 57. The vertical support member 22 is desirably of a channel formation as shown most clearly in Fig. 6, and it is of a shape and construction to receive a sensitized material holder or carrier 58, shown in dotted lines in Figs. 1 and 2 and in solid lines in Fig. 3, which contains sensitized material 58a. Hereinafter the part 58 is referred to as the holder, merely for convenience of description.

The structure and proportions of the channel formation of the vertical support member 22 with respect to the sensitized material holder 58 are such that the said holder 58 will drop freely in a vertical direction when released by the means now to be described, constituting a part of the testing equipment. In order to maintain the said holder 58 in its initial position before the dropping thereof, I provide any suitable means, but for the purpose I have herein represented latching means consisting of a lever 59 having a release pad 60 for manual manipulation, said lever being secured to the vertical support member 22 in a horizontal position on a bracket 61, 61, itself held to the vertical support member 22 by means of screws 62, 62 (Fig. 2). The said lever 59 is itself attached to the bracket 61 by a shoulder screw 63, being free to pivot thereon, and is provided with a laterally extending finger 64, best shown in Figs. 1, 9 and 13. The purpose of the said finger 64 is to engage a ledge 65 of the sensitized material holder 58, best shown in Fig. 3, which is formed by providing an opening in the said holder 58. The vertical support member 22 is provided with a suitable opening 66 through which passes the said laterally extending finger 64, as best shown in Fig. 9.

When the sensitized material holder 58 is engaged by the said laterally extending finger 64, the said holder is held in the position indicated in Figs. 1, 2 and 3. When, however, the pad 60 of the lever 59 is pressed by the operator in a rearward direction so as to withdraw the finger 64 from the ledge 65 of the holder 58, the latter is permitted to drop vertically.

Figures 13, 14:
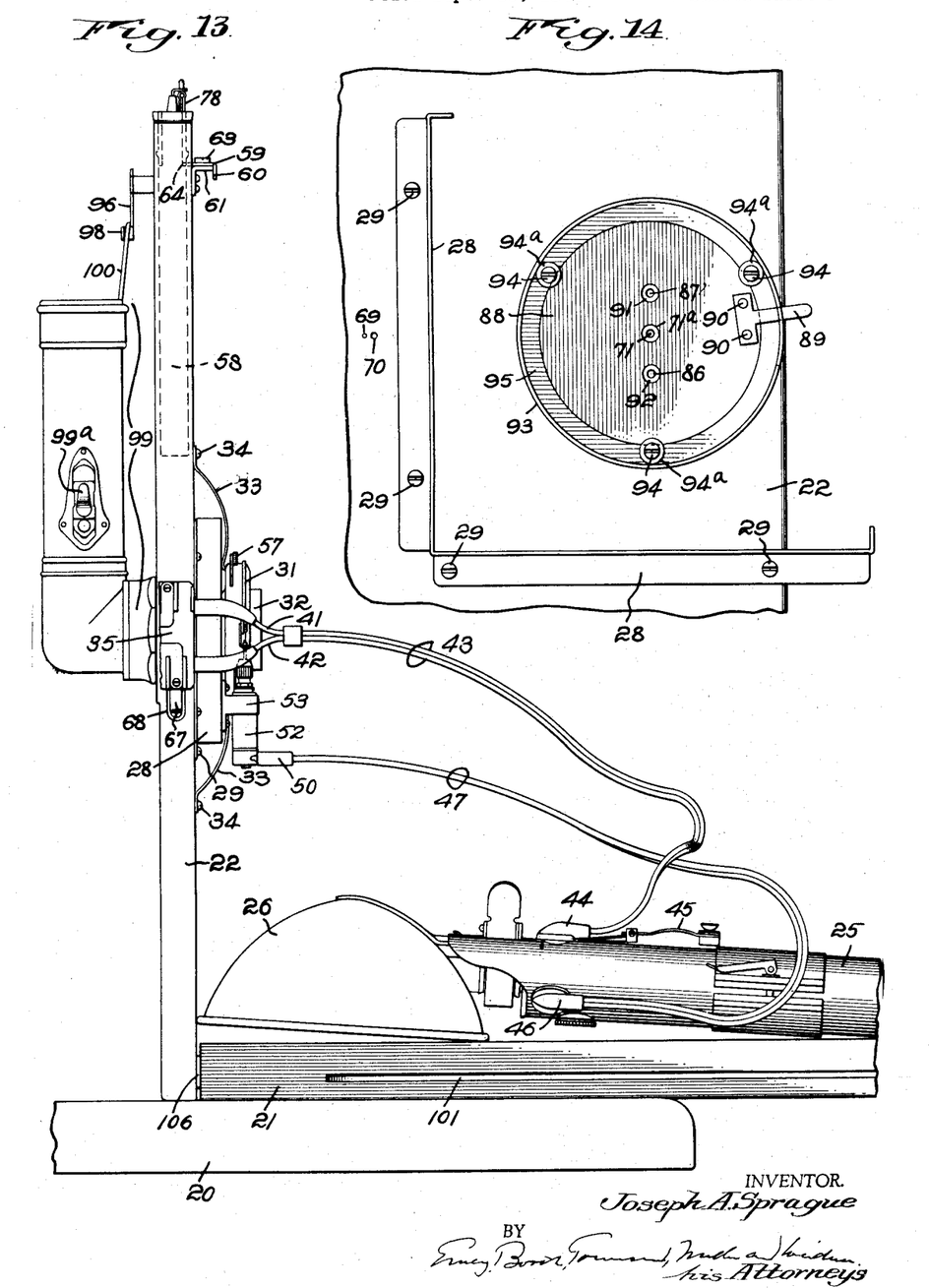
Fig. 13 is a view similar to Fig. 1, with the testing device in condition for making a visual test.
Fig. 14 is a fragmentary view of the synchronizer tester vertical frame, showing the means for supporting the lens board, the gate or light valve being set in condition for making a visual test.

The switch 35, best shown in Figs. 1, 5, and 13, is provided with an operating arm 67. The said switch is desirably a standard switch obtained on the open market and is preferably of the type known as Microswitch and the operating arm 67 is a part of the said switch as purchased.

Figure 12:
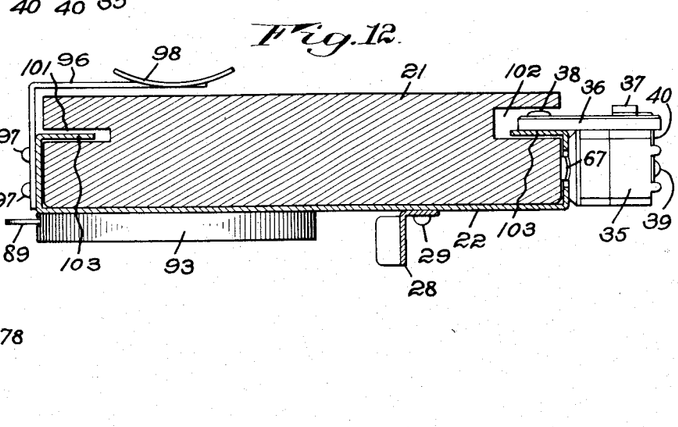
Fig. 12 is a section through Fig. 9 on the line 12—12 thereof, showing the position of the parts when folded for transportation.

The vertical support member 22 is provided with a suitable cut-out or opening 68, as indicated in Figs. 1 and 12, to allow the arm 67 to extend through one of the side walls of the vertical support member 22, so that the switch operating arm 67 extends into the path of the sensitized material holder 58 when the latter is permitted to drop in the vertical support member 22. This action is best indicated in Fig. 3, wherein the switch operating arm 67 is shown depressed as the sensitized material holder 58 passes said operating arm. When the said sensitized holder 58 reaches the position shown in Fig. 5, the said switch operating arm 67 is moved by the said holder 58 in a left hand direction viewing said figure, thus operating the switch 35 and closing the contacts thereof. This movement completes a circuit between the wires 41, 42 constituting the cable 43 and which, as already stated, is connected to the synchronizer battery case 25 by the plug 44, thus causing the lamp 27 to be ignited and the electromagnetic tripper 52 to be operated, thereby operating the camera shutter 31 just as such shutter would have been operated had the switch 45 of Fig. 1 been operated in the usual manner in taking a photograph by the camera, instead of by operating the switch 35 of the testing equipment.

The sensitized material holder 58 is a standard film holder with, however, certain modifications to be presently described. For the purpose of making a record test by my equipment, no modification of the film holder 58 from a standard construction is necessary.

The operation of the structure thus far described is as follows:

The sensitized material holder 58 is loaded with a sensitized sheet of paper or film and is placed in the channel of the vertical support member 22, being retained by the latch member or lever 59 until it is desired to make the test. When a test is to be made, the dark slide of the holder 58 having first been withdrawn, the said holder is released by the latch member or lever 59 and drops by gravity, and upon reaching the switch operating arm 67 the switch 35 is operated, thereby completing the circuit through cable 47 to battery case 25, flashlamp 27 and electromagnetic tripper 52, thus operating the shutter 31.

In order to ascertain the instant of time when the shutter 31 is caused to open with relation to the flash of the photoflash lamp 27, I have provided two openings 69, 70, in the vertical support member 22, as shown in Figs. 2, 3, 5, etc. The opening 69 is of smaller diameter than the opening 70 so as to allow a reduced amount of light to pass therethrough, thereby providing an opportunity better to record the light intensity, since, as is well known, the more light passing through the holes 69, 70, the denser will be the exposure. The perforated area provided by the openings 69, 70 admits lights from the flashlamp to the sensitized material, such perforated area being shaped to admit such light in varying intensity at different parts thereof, merged as shown.

As the sensitized material holder 58 passes the switch operating arm 67, as previously described, and thus causes the flashlamp 27 to be ignited and the shutter 31 to be operated, the sensitized material 58a that is in the said holder 58 will be behind the holes 69, 70, and said holes 69, 70 and the shutter opening of the shutter 31 all receive light from the flashlamp 27. Therefore an unexposed area of the sensitized material 58a will appear behind the opening 71, provided in the front face of the vertical support member 22, as shown in Fig. 3, and which opening 71, as there shown, is aligned with the center of the opening of the shutter 31, as indicated in Fig. 5, an unexposed area being also behind the holes 69, 70, previously referred to. That is, said opening 71 is in what may be termed line-of-vision register with the center of the opening of the shutter. Therefore, light is admitted to the sensitized material 58a in the holder 58. Inasmuch as the holes 69, 70 are always open, the sensitized material 58a will be exposed during all of the flash of the photoflash lamp 27, but light is excluded from the hole 71 by the shutter 31 at all times excepting when the shutter aperture is open, it being noted that the shutter aperture is controlled by the electromagnetic tripper 52, as previously explained. With respect to the making of recorded tests, opening 71 is used and also either opening 69 or 70 or both 69 and 70. In practice, I have found that it is better to use two openings 69 and 70, one larger than the other, thus giving the appearance indicated at the left in Fig. 8 at 73, to be more fully referred to, but it is not essential to my invention that both openings 69 and 70 be employed.

Therefore if a photoflash lamp is placed in the socket of the battery case 25 and the holder 58 of suitable construction is loaded with sensitized material 58a, and is placed in the vertical support member 22 and then allowed to drop by manual manipulation of the latch member or lever 59, a circuit is completed to the flashlamp 27 and the electromagnetic tripper 52, as already explained. Consequently a flash will take place and will be recorded for the full length of such flash through the holes 69 and 70, and during the time that the shutter is open, light will pass through the hole 71 to the sensitized material 58a and will also be recorded.

Upon development of the sensitized material 58a, the exposed areas will appear as clearly indicated in the chart Fig. 8, wherein the area behind the shutter opening 71 will appear as indicated at 72, and the exposed area behind the openings 69 and 70 will appear as indicated at 73. When the exposures do appear as in the chart Fig. 8, the shutter is in proper synchronous relation (that is, it is simultaneous in functioning with the flashlamp as indicated at the exposed area 73).

It will be noted that the exposed area indicated at 73 in the chart Fig. 8 builds up from no exposure to a very dense exposure, and then drops down to no exposure. It is desirable to have the opening of the shutter 31 take place during that area of greatest illumination, that is, to have it occur between the dotted lines a and b of the chart Fig. 8. If, however, the exposed area 72 appears below the dotted line a or above the dotted line b of the chart Fig. 8, the shutter 31 would be out of synchronous relation with the flashlamp (i. e., would not be functioning simultaneously therewith). If the said exposed area 72 appeared below the line a, the shutter 31 would be operated too soon. If said exposed area 72 appeared above the line b of the chart Fig. 8, the shutter 31 will be operated too late. The lines a and b of the chart Fig. 8 therefore represent the desirable area in which the shutter 31 should be operated. In the instance illustrated in the chart Fig. 8, the shutter 31 was operated within the said desirable area but slightly early in time, being nearer the dotted line a. This is the preferred adjustment because with use the battery of the synchronizer will become deteriorated and the synchronizer will consequently operate slightly more slowly. Therefore, as the battery voltage drops the exposed area 72 would move slightly upward with respect to the chart Fig. 8 if a further test were to be made.

The speed at which the sensitized material holder 58 travels downward when released is not critical, but the position along the vertical support member 22 of the switch 35 with its operating arm 67 should be such that the flashlamp 27 will be ignited during the time that the sensitized material 58a in the holder 58 is in position behind the holes 69, 70 and 71. After such position for the location of the switch 35 along the support member 22 has once been located either by mathematical determination or by experiment, no further adjustment of parts is required for making a record test by the testing equipment herein disclosed. Since the entire duration of the flash is recorded, and since the holes 69, 70 in the support member 22 are in horizontal alignment with the hole 71, it is always an easy matter to plot the exposed area 72 against the exposed area 73, and since the entire length of the exposed area 73 never is greater than twenty-five per cent of the length of the piece of sensitized material 58a, a considerable latitude is allowable in the adjustment of the position of the switch 35. Nevertheless for best all round performance I have found that the proportions represented in the drawings of this application are the correct proportions of the vertical support member 22 with the illustrated position of the switch 35 being ideal for the testing of all flashlamps of known manufacture.

The sensitized material holder 58 is of the usual construction but with slight modifications when used for visual tests. The structure of said holder 58 is most clearly evident from Fig. 6, wherein it is represented as provided with separating plates 74, 75, film retaining strips 76, 76, grooves 77, 77 for receiving dark slides, and the dark slides 78, 78, only one of which is shown, the other having been removed to make exposure of sensitized material 57a in the manner previously described.

When the testing equipment of my invention is used for making the visual test, the holder 58 is not loaded with sensitized material, but its position is reversed as it is placed in the vertical support member 22, so that an opening 79 of the dark slide 78 of the holder (shown in Fig. 6) is in alignment with the hole 71 of the vertical support member 22, (that is, when the holder 58 is dropped, said opening 79 comes in line-of-vision register with the hole 71 of the vertical support member 22) and the openings 80, 81 of the separating plates 75, 74 respectively (shown in Fig. 6) are in horizontal alignment with an opening 79 in dark slide 78, and are of sufficient length to uncover holes 82 and 83, also provided in the dark slide 78. This structure is best shown in the sectional view Fig. 18. The said dark slide 78 is provided with the said three openings 79, 82, 83. The opening 82 is provided with a red filter, indicated at 84, and the opening 83 is provided with a green filter, as indicated at 85. My invention is not limited to the provision of filters of the stated colors, as any two suitably contrasting colors may be employed.

Figure 18:
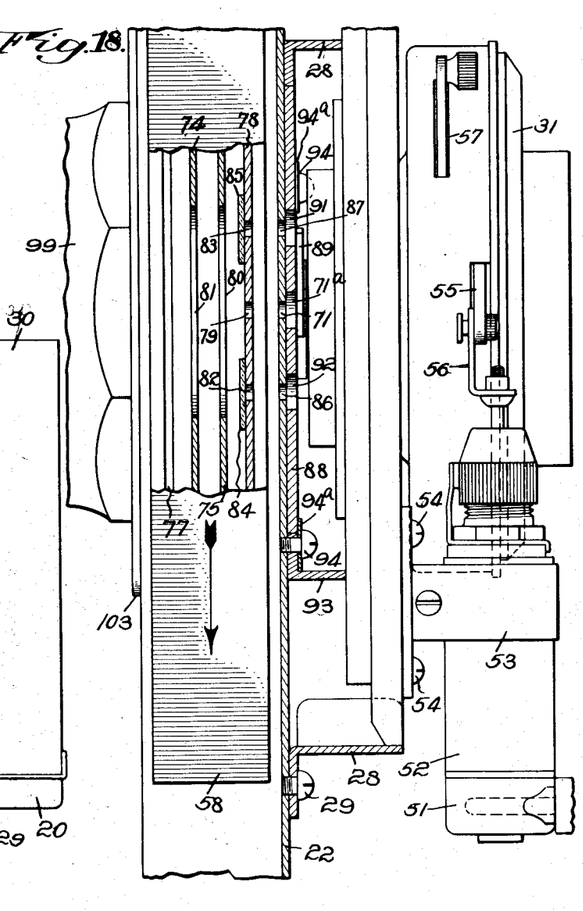
Fig. 18 is a section through Fig. 15, showing the position of the dark slide when the parts are in position for making a visual test.

When the dark slide 78 is in position for making a visual test, the holder parts will appear as shown in Fig. 18, and when they are in position for making a record test, the holder parts will be positioned as shown in Fig. 6.

For making a visual test, two additional holes are provided in the vertical support member 22, being indicated in Fig. 7 by dotted lines at 86, 87, and in full lines in Fig. 14, and in section in Fig. 18. The three holes 86, 87 and 71 are shown in Figs. 3, 7, 14 and 16 as in a true vertical line, which is their preferred relation, but to which exact relation my invention is obviously not limited. They must be in any case near enough together to be within the confines of the shutter opening when the shutter is opened fully, and the more nearly they are arranged in a true vertical relation, obviously the greater will be the time required for the sensitized-material holder 58 to pass all of said holes. When making a record test, it is necessary that the holes 86, 87 are covered or capped. For this purpose, I have provided a light valve consisting of a disk 88, best shown in Figs. 6, 7 and 14 as mounted on the vertical support member 22, and as having a handle 89 attached thereto by rivets 90. The said light valve or disk 88 is provided with openings 91 and 92 for alignment with the openings 87 and 86 respectively. When the said light valve or disk 88 is in position for making a visual test, it will be precisely as indicated in Fig. 14. The said light valve or disk 88 is held in place by a ring 93 concentric therewith and secured to the vertical support member 22 by large headed screws, 94. The said concentrically arranged ring 93 is provided with a flange 95 having an opening into which is fitted the said light valve or disk 88. The screws 94, and washers 94a are provided to hold the light valve or disk 88 in position in the ring 93 and against the vertical support member 22.

When the said light valve or disk 88 is turned in a clockwise direction viewing Figs. 7 and 14, the handle 89 travels in a slot provided therefor in the ring 93. The openings 91 and 92 will thus be moved out of alignment with the openings 86, 87, and thereby all light is prevented from passing through the holes 86, 87 or from reaching the sensitized material 58a in the holder 58. The light valve or disk 88 is in this position when making a record test, and when its handle 89 is moved in a contraclockwise direction viewing Figs. 7 and 14, the hole 91 of the light valve or disk 88 will be in alignment with the hole 86 (that is, in line-of-vision register). The parts will then be in the position shown in Fig. 14, which is the position of the parts when making a visual test. Inasmuch as the openings 80 and 81 of the separating plates 75, 74 will be in alignment with the hole 71 and the holes 86, 87, light can pass through the sensitized material holder 58 and through the vertical support member 22 and the disk 88 when the said sensitized material holder 58 reaches the position shown in Fig. 18, and also through the shutter 31 when such shutter is open.

In order to provide a fixed source of illumination for use when making a visual test, the vertical support member 22 has attached thereto a supplemental support member 96 by means of rivets 97, best shown in Figs. 9, 12 and 16, and also in Figs. 1 and 3, said support member 96 having a suitable formation 98 to which is hung, as shown in Figs. 13 and 16 a flashlamp 99 by means of a ball 100. The flashlamp 99 is of the structure best shown in Figs. 13 and 16, and is the standard flashlamp as carried by armed forces of the United States, said flashlamp functioning in the usual way. It is of the right angle type and is so positioned that the holes 86, 87 and 71 will be illuminated when the battery case of said flashlamp 99 is in place and the switch 99a has been operated as indicated in Fig. 13.

In Fig. 13 the equipment is shown set up for making a visual test. The synchronizer battery case 25 is laid on the horizontal member 21 and the cable 47 is plugged to the electromagnetic tripper 52 by means of plug 50 and to the battery case 25 by means of the plug 45. The switch 35 is connected to the battery case 25 by means of the cable 43 and the plug 44. When the sensitized material holder 58 is released in the manner previously described, the shutter 31 will be operated as previously set forth.

Figure 15:
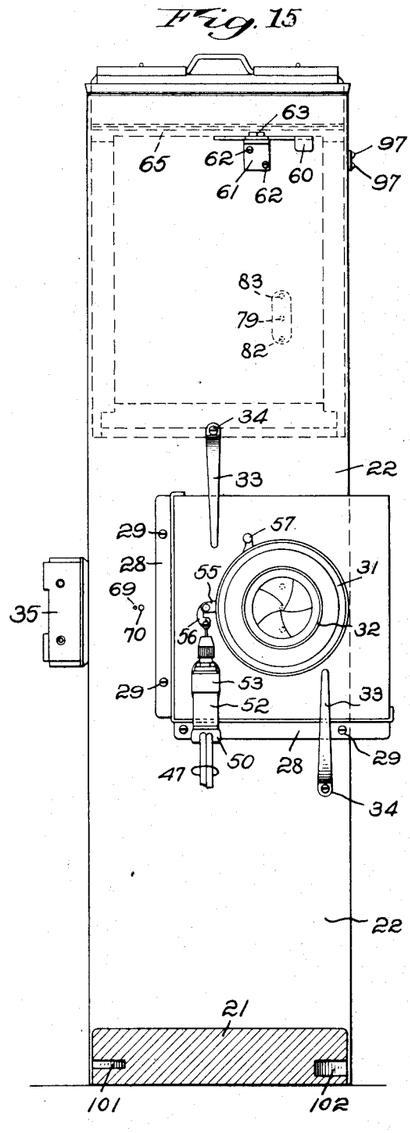
Fig. 15 is a view similar to Fig. 2 but showing the sensitized material holder or carrier in dotted lines, in position for making a visual test.

In order to make a visual test, the light valve or disk 88 is set in the position shown in Fig. 14 and the sensitized material holder 58 is placed in the position shown in Fig. 15. When such holder 58 is placed in the vertical support member 22, in the position indicated in Figs. 15 and 16, and is allowed to drop by releasing the latch member or lever 59, the electromagnetic tripper 52 will be operated when the said holder 58 reaches the switch operating arm 67, by completing a circuit through the cable 43 to the battery case 25 and to the electromagnetic tripper 52 through the cable 47, the flashlamp 99 having previously been illuminated manually in the usual manner. The shutter 31 will be caused to open by the completion of the circuit as stated, and the operator will see the light from the flashlight 99 projected through the openings 86, 87 if the shutter is in proper synchronous relation with the flashlamp 27.

If light is visible only through holes 87 and 71 the synchronizer has been adjusted to function too early for the best results, and if light is seen only through holes 71 and 86, the synchronizer has been adjusted to function too late for the best results. The synchronizer tripper should then be adjusted so that light will be visible through all three openings 87, 71 and 86.

The filters 84, 85 are provided in order that the operator may determine through what holes the light passes. When a start is made on adjusting the synchronizer by beginning the visible test now being described, it is very likely that the adjustment of the synchronizer will be found to be far from correct. Therefore, at the beginning of the test of the synchronizer, it is probable or possible that the operator may see light through one hole only, and if light that he sees is green, he will know that the position of the synchronizer has been improperly set for too late functioning. If, on the contrary, the operator sees only a red light he will know that the positioning of the synchronizer is too early. If he sees a green light and a white light, he will know that the positioning of the synchronizer is close to the correct position, but is still too late, and if he sees a white light and a red light, he will know that the positioning of the synchronizer is early but very close. All that is necessary is for the operator to make adjustment in the proper direction so that he will see both a red light and a green light, and of course when he sees them, he will also see a white light. He will then know that the synchronizer being tested is in a position of correct adjustment for proper functioning.

When using the visual synchronizer test, it is important that the switch 35 be in proper position with respect to the sensitized material holder 58 when contact is made at the switch 35, so that there will be a proper time delay between the time of contact and that instant when the openings 83, 82 of the said sensitized material holder 58 are in alignment with the openings 87, 86 of the vertical support member 22 (that is, in line-of-vision register). This can be readily checked when using the synchronizer test as a recording test. It is only necessary to adjust the synchronizer switch 35 and its operating arm 67 in a vertical direction so that the flash takes place at a proper instant of time with respect to the opening 71. After this adjustment has once been made for a flash bulb of given manufacture (that is to say, for a flash bulb known to have a certain time delay, such, for example, as twenty milliseconds), all tests can be then made without further adjustments so long as flash lamps having that time delay are used with the synchronizer that is being tested.

The synchronizer testing equipment herein disclosed is first adjusted by making a record exposure and the position of the switch 35 is adjusted in a vertical direction along one side of the vertical support member 22, so that the flash as indicated by the exposed area 72 is located between the dotted lines $a$ and $b$ of the chart Fig. 8. The position of the switch 35 with respect to the position of the sensitized material holder 58 at the time contact is made will then be correct for making a visual reading when testing lamps known to have the same time lag or delay. If it is desired to test a lamp having a known different time lag or delay, the switch 35 must be moved along and readjusted on the vertical support member 22 until the exposed area 72 will be between the lines $a$ and $b$ of the chart Fig. 8. If the flashlamp is being tested that is of a different characteristic than the one illustrated in the chart Fig. 8, by which is meant a flashlamp having a longer duration of flash or a shorter duration of flash, the space between the dotted lines $a$ and $b$ must be increased or decreased accordingly, and of course it will be necessary to adjust the position of the switch 35, so that the flash, as indicated by the exposed area 72 will be between the repositioned two lines $a$ and $b$. Since the holes 69, 70 and 71 on the vertical support member 22, through which light passes, are in horizontal alignment when the shutter tripper is once adjusted for making a record test, the exposed areas 72 and 73 will always be as indicated in the chart Fig. 8.

The synchronizer testing equipment herein disclosed is desirably of such construction that it can readily be folded for transportation or storage. To that end the base member 21 is provided with two elongated slots 101 and 102 along the opposite lateral edges thereof, as indicated in Fig. 2. The said vertical support member 22 may be detached from the base member 21 by loosening screws 23, and the vertical member 22 having the turned-over end or U-shaped formations 103, 103, shown in Fig. 12, can be slid into the said parallel slots 101, 102, after having been removed from the base member 21, as most clearly shown in Figs. 9 and 12. Attached to the screws 23 are rubber bumpers 104 to absorb shock when the sensitized material holder 58 reaches the limit of its downward travel following its release by movement of the latching means or lever 59.

A résumé of the operation of the disclosed synchronizer testing equipment is as follows.

The equipment is assumed to be in that position of the parts shown in Fig. 9. The vertical support member 22 is first withdrawn from the parallel slots 101, 102 of the base member 21 and the screws 23 are loosened a sufficient distance to allow the notch openings 105 of the vertical support member 22 to be slid behind the heads of the screws 23, which are buried in the rubber bumpers 104 and washers 106, one of said washers being shown in Fig. 1. The screws 23 are then tightened and the equipment is therefore in the position shown in Fig. 1. A flashlamp battery case such as 25 is then mounted in the hole 24 or is held in position by clamping or other means as hereinbefore indicated. The lens board 30 having mounted thereon a shutter 31 and lens 32 is then placed in position in the lens board carrier 28 and is securely held thereto by means of the springs 33. The plug 46 of the cable 47 is then connected to the battery case 25 and the plug 44 of the cable 43 is also connected to the said battery case, as clearly shown in Fig. 1.

The sensitized material holder 58 is loaded with a sheet of sensitized material 58a, it being understood that the entire apparatus is in a photographic dark room in the field or other place of use. A flash lamp or bulb 27 is placed in the socket of the battery case 25, the shutter 31 is set for the desired shutter speed, and the sensitized material holder 58 is allowed to drop by the releasing action of the lever 59 constituting the latching means. When the said sensitized material holder 58 reaches the contact spring 67, a circuit is completed between the wires 41 and 42, thus causing the flash lamp 27 to be ignited and the electromagnetic tripper 52 to be operated in the manner previously described. The shutter 31 will then be caused to be opened and the sensitized material 58a will be in position behind the holes 69, 70, 71 in the vertical support member 22, thus exposing the sensitized material 58a and upon development thereof it will appear as shown in the chart Fig. 8 if the tripper is properly adjusted.

If the exposed area 72 is below the line a of the chart Fig. 8, it will be necessary to adjust the electromagnetic tripper 52 so that the said shutter 31 will be operated relatively later than when the described test was made. If the exposed area is above the dotted line b of the chart Fig. 8, the electromagnetic tripper 52 must be adjusted to cause the flash to occur relatively earlier than in the described test. When a proper adjustment has been found and the sensitized material 58a is developed, the latter will appear as shown in the chart Fig. 8, where the exposed area 72 will be located between the dotted lines a and b of the chart Fig. 8.

In order to make a visual test, the sensitized material holder 58 is reversed in position, but is held from dropping by the latch member or lever 59, the flashlamp 99 is hooked onto the flashlamp support 96, and the switch 99a is operated in usual manner to cause the flashlamp 99 to be illuminated. Said sensitized material holder 58 is then released by pressing upon the pad 60 of the latch member or lever 59, whereupon said holder 58 drops. As the shutter 31 is operated in the manner previously described, one or more of the holes 87, 71 and 86 will be illuminated and the electromagnetic tripper 52 is adjusted to cause the said shutter to be operated either later or earlier depending on which holes are illuminated, until an adjustment is reached where all three holes 87, 71 and 86 are illuminated as described. The operator will then see a green light and a red light with a white light between them.

The battery case 25 is usually laid flatwise on the horizontal base member 21 when making a visual test rather than positioning it upright in the hole or other support provided therefor, so as thus to provide a clear path for the operator to view the holes 87, 71 and 86 through the lens 32.

The synchronizer tester equipment herein disclosed can be used both for making recorded tests and visual tests. This is very desirable because at times the adjustment is made by someone other than the operator of the camera, and it is very desirable that the operator of the camera have at his disposal the record of the performance of his synchronizer equipment.

It is, however, necessary to use at least one flashlamp when making the record test. The visual test method is used for quick checking upon the performance of the synchronizer equipment, and it is also used when a record test is to be made. The usual procedure is to adjust the synchronizer as accurately as possible by the visual method and then to make a record test. In this way it is necessary to use only one flashlamp.

Actually, in the experimental work and in the designing and building and testing of the equipment herein disclosed, it was necessary to flash a great many lamps in order accurately to ascertain the correct position for the switch 35. After such correct position for the switch 35 has once been found, additional apparatus can be manufactured from fixed measurements, since the velocity of the sensitized material holder 58 remains constant enough for all practical purposes. Therefore, it is never necessary for the operator of the disclosed equipment to use more than one flash bulb in adjusting any one synchronizer, inasmuch as he first proceeds to make his adjustment by the visual method, and when all three holes (that is, the red, the white and the green holes) are seen when making the visual test, the record test which follows will be that shown in the chart Fig. 8, and it is only necessary to make the recorded test when the record of that test is to be used for furture reference.

I am aware that heretofore there has been provided an equipment having visual testing means for photoflash synchronizers, but so far as I am aware I am the first to provide a testing equipment for photographic flashlight synchronizers by which a visual test can be made and by which a record test can also be made. So far as I am aware, I am the first to provide an equipment for testing synchronizers having electromagnetic trippers.

Heretofore no means has been provided so far as I am aware for checking a synchronizer tester. In other words, the operator has heretofore been compelled to assume that the testing mechanism is functioning properly. I have, on the contrary, provided means for readily checking the performance of the tester. By my invention I have provided a synchronizer tester particularly adapted to be used with electromagnetic tripper synchronizers, and I have provided means for visually checking the synchronization to a high degree of accuracy, and I have also provided means to obtain a record of the synchronization test. No one heretofore so far as I am aware has produced an equipment or device having such capacities.

The disclosed equipment, while very simple in construction and one which can be manufactured at relatively low cost, is the result of a great deal of experimentation covering a period of several years, and it has been found in practice that the results produced by the disclosed equipment are equal to the accuracy of the flashlamps that are being tested. The disclosed equipment is so simple that anyone capable of making a photograph can readily understand its operation and can produce very accurate results regardless of the lack of previous experience, and inasmuch as the entire equipment can be folded into a compact package, the equipment can readily be transported for use in a dark room in the field and there set up for operation in a very few minutes.

Having thus described one illustrative embodiment of the invention, it is to be understood that although specific terms are employed, they are used in a generic and descriptive sense and not for purposes of limitation, the scope of the invention being set forth in the following claims.

I claim:

1. A testing equipment for photographic flashlamp synchronizers of the electromagnetic shutter-release type, including in combination: a vertical support and guide member provided with means for supporting a shutter and shutter-tripping means; a flashlamp supported in front of said shutter, said supported shutter being interposed between said support and guide member and the flashlamp; a sensitized material holder slidable downwardly in said member; a switch mounted on said support and guide member in the path of sliding movement of said holder, said switch being in electrical circuit with said shutter tripping means and with said flashlamp and with a source of potential, so that when said switch is closed by the downward movement of said sensitized material holder the flashlamp is operated and the shutter is momentarily opened; said vertical support and guide member having a shielded portion provided with two horizontally aligned light-passage openings, one only of said openings being behind the shutter, the other opening being exposed at all times to the light from the flashlamp, and said sensitized material holder being located and adapted in a recorded test to be dropped behind said two openings of said shielded portion, so as, in dropping, to present such sensitized-material for the recorded test and to actuate said switch, thereby to complete the circuit to the flashlamp and to cause said electromagnetic tripping means to open the supported shutter, and thus expose one of said two openings for the making of a record area on such sensitized material in the holder, and also simultaneously exposing the other of said two openings for the simultaneous making of another record area on the said sensitized material through said second opening, and spaced laterally from the first referred to record area, thereby to determine whether said two record areas are in sufficiently close horizontal alignment to indicate substantially correct synchronization.

2. A testing equipment for photographic flashlamp synchronizers of the electromagnetic shutter-release type, including in combination: a vertical support and guide member provided with means for supporting a shutter and shutter-tripping means; a flashlamp supported in front of said shutter, said supported shutter being interposed between said support and guide member and the flashlamp; a sensitized material holder slidable downwardly in said member; a switch mounted on said support and guide member in the path of sliding movement of said holder, said switch being in electrical circuit with said shutter tripping means and with said flashlamp and with a source of potential, so that when said switch is closed by the downward movement of said sensitized material holder the flashlamp is operated and the shutter is momentarily opened; said vertical support and guide member having a shielded portion provided with two horizontally aligned light-passage openings, one only of said openings being behind the shutter, the other opening being exposed at all times to the light from the flashlamp, said shielded portion being also provided with two other light-passage openings respectively above and below one of said openings and sufficiently close thereto so that the three openings are within the area of the opening of the supported shutter, and said sensitized material holder being located and adapted in a recorded test to be dropped behind said openings in said shielded portion, so as, in dropping, to actuate said switch, thereby to complete the circuit to said flashlamp and to cause said electromagnetic tripping means to open the supported shutter, and thus expose one of said openings for the making of a record area on the presented sensitized material carried in the holder.

3. A testing equipment for photographic flashlamp synchronizers including, in combination, a support member having a shielding face that is upright when in operating position, a lens board receiver attached to such shielding face of said support member and itself adapted to have attached temporarily thereto a camera lens board and shutter for the testing operation, a tripper for the shutter, an electrical switch mounted upon said support member in a position to be operated by a dropped element, which for recorded tests is a loaded sensitized-material holder presenting such material for the test, and which element is dropped in the test from a point above said switch, means for positioning in suitable relation to said upright support member a synchronizer battery case with flashlamp and source of potential, circuit wiring means for connecting said battery case, flashlamp, source of potential, and an actuable movable element that is connected to the tripper of the shutter used in the testing operation, the said support member with its said shielding face having a construction to receive and then to permit to drop therein behind said shielding face such element when released, so as by such dropping to operate said electrical switch, thereby to complete the circuit to the flashlamp and to actuate said movable element connected to said shutter tripper, the said shielding face being provided with two horizontally aligned light-passage openings, the said shutter being supported in front of one only of said openings, the said flashlamp being supported in horizontal alignment with said openings in said shielding face, the other of said openings being exposed at all times to the light from the flashlamp.

4. A testing equipment for photographic flashlamp synchronizers including, in combination, a support member having a shielding face that is upright when in operating position, a lens board receiver attached to such shielding face of said support member and itself adapted to have attached temporarily thereto a camera lens board and shutter for the testing operation, a tripper for the shutter, an electrical switch mounted upon said support member in a position to be operated by a dropped element, which, for recorded tests, is a loaded sensitized-material holder presenting such material for the test, and which element is dropped in the test from a point above said switch, means for positioning in suitable relation to said upright support member a synchronizer battery case with flashlamp and source of potential, circuit wiring means for connecting said battery case, flashlamp, source of potential, and an actuatable movable element that is connected to the tripper of the shutter used in the testing operation, the said support member with its said shielding face having a construction to receive and then to permit to drop therein behind said shielding face such element when released, so as by such dropping to operate said electrical switch, thereby to complete the circuit to the flashlamp and to actuate said movable element connected to said shutter tripper, the said support member being provided in the said shielding face thereof with two openings in close proximity, one being larger than the other, and behind which two openings the said dropped element passes and both of which openings receive light from the said flashlamp and also admit light to the sensitized material if carried in such dropped element, said two openings being in such close proximity that when the flashlamp is emitting light, the light through said two openings merges when striking the sensitized material, said shielding face being also provided with another opening, which is positioned in line-of-vision register with the center of the opening of such shutter, said three openings providing for a recorded test and being all in horizontal alignment.

5. A testing equipment for photographic flashlamp synchronizers of the electromagnetic shutter-release type including, in combination, a vertical support and guide member provided with means for supporting a shutter and shutter tripping means, a flashlamp supported in front of said shutter, said supported shutter being interposed between said support and guide member and the flashlamp, a dropable element slidable downwardly in said member, a switch mounted on said support and guide member in the path of sliding movement of said droppable element, said switch being in electrical circuit with said shutter tripping means and with said flashlamp and with the source of potential, so that when said switch is closed by the downward movement of said sensitized dropable element the flashlamp is operated and the shutter is momentarily opened, said vertical support and said guide member having a shielded portion that is provided for the purpose of a visual test with three openings at different levels therein, but sufficiently adjacent to each other to be all within the area of the full opening of the said supported shutter, and behind which three openings the dropped element passes and which three openings all receive light from the said flashlamp, in the testing operation.

6. A testing equipment for photographic flashlamp synchronizers of the electromagnetic shutter-release type including, in combination, a vertical support and guide member provided with means for supporting a shutter and shutter tripping means, a flashlamp supported in front of said shutter, said supported shutter being interposed between said support and guide member and the flashlamp, a droppable element slidable downwardly in said member, a switch mounted on said support and guide member in the path of sliding movement of said dropable element, said switch being in electrical circuit with said shutter tripping means and with said flashlamp and with the source of potential, so that when said switch is closed by the downward movement of said sensitized droppable element the flashlamp is operated and the shutter is momentarily opened, said vertical support and said guide member having a shielded portion that is provided for the purpose of a visual test with three openings at different levels therein, but sufficiently adjacent to each other to be all within the area of the full opening of the said supported shutter, and behind which three openings the dropped element passes and which three openings all receive light from the said flashlamp, in the testing operation, and means for capping, when the equipment is to be used for a recorded test, such of said three openings in the shielding face as are used in making a visual test but are not used when making a recorded test, said dropable element when the testing equipment is used for a recorded test, being a loaded sensitized-material holder presenting such material for the test.

7. A testing equipment for photographic flashlamp synchronizers of the electromagnetic shutter-release type, including, in combination, a vertical support and guide member provided with means for supporting a shutter and shutter-tripping means, a flashlamp supported in front of said shutter, said supported shutter being interposed between said support and guide member and the flashlamp, a sensitized material holder slidable downwardly in said member, a switch mounted on said support and guide member in the path of sliding movement of said holder, said switch being in electrical circuit with said shutter tripping means and with said flashlamp and with a source of potential, so that when said switch is closed by the downward movement of said sensitized material holder the flashlamp is operated and the shutter is momentarily opened, the said vertical support and guide member having a shielded portion with a plurality of adjacent light-passages in the face thereof, the said sensitized material holder, in dropping, passing behind at least two of the said light-passage openings, the said shutter being so supported that the center of the shutter is in line-of-vision register with one of said light-passage openings, another of said openings being exposed at all times to the light from the flashlamp.

8. A testing equipment for photographic flashlamp synchronizers of the electromagnetic shutter-release type, including, in combination, a vertical support and guide member provided with means for supporting a shutter and shutter-tripping means, a flashlamp supported in front of said shutter, said supported shutter being interposed between said support and guide member and the flashlamp, a sensitized-material holder slidable downwardly in said member, a switch mounted on said support and guide member in the path of sliding movement of said holder, said switch being in electrical circuit with said shutter tripping means and with said flashlamp and with a source of potential, so that when said switch is closed by the downward movement of said sensitized material holder the flashlamp is operated and the shutter is momentarily opened, said vertical support and guide member having a shielded portion provided in the face thereof with a light passage, the shutter being so supported that the center of the shutter is in line-of-vision register with said light passage, said face of the vertical support and guide member also having two other light passages in substantially vertical alignment with said first mentioned light passage, all three of said light passages being sufficiently in proximity to be within the area of the shutter opening when fully open, there being in the face of the vertical support and guide member still another light passage which is in horizontal alignment with the first mentioned light passage whereby visual testing may be effected.

9. A testing equipment in accordance with claim 8, but wherein to provide such source of illumination, said vertical support and guide member have means to support at its back face a lamp for the purpose of illuminating the light passages of said vertical support and guide member in making a visual test.

10. A testing equipment for photographic flashlamp synchronizers including, in combination, a support member having a shielding face that is upright when in operating position, a lens board receiver attached to such shielding face of said support member and itself adapted to have attached temporarily thereto a camera lens board and shutter for the testing operation, a tripper for the shutter, an electrical switch mounted upon said support member in a position to be operated by a dropped element, which, for recorded tests, is a loaded sensitized-material holder presenting such material for the test, and which element is dropped in the test from a point above said switch, means for positioning in suitable relation to said upright support member a synchronizer battery case with flashlamp and source of potential, circuit wiring means for connecting said battery case, flashlamp, source of potential, and an actuatable movable element that is connected to the tripper of the shutter used in the testing operation, the said support member with its said shielding face having a construction to receive and then to permit to drop therein behind said shielding face such element when released, so as by such dropping to operate said electrical switch, thereby to complete the circuit to the flashlamp and to actuate said movable element connected to said shutter tripper, the construction being such that the dropped element operates the electrical switch, thereby to complete the circuit to the flashlamp and to actuate the said movable element connected to the shutter tripper, the said support member being provided in the said shielding face thereof with a perforated area for admitting light from the flashlamp and behind which perforated area the dropped element passes, said perforated area admitting light to the sensitized material and being shaped to admit such light in varying intensity at different parts thereof, said shielding face being also provided with an opening which is positioned in line-of-vision register with the center of the opening of the shutter, said opening and said perforated area being in horizontal alignment, and said perforated area being exposed at all times to the light from the flashlamp.

11. A testing equipment for photographic flashlamp synchronizers of the electromagnetic shutter-release type including, in combination, a vertical support and guide member provided with means for supporting a shutter and shutter tripping means, a source of illumination supported by said vertical support and guide member, a droppable element slidable downwardly in said vertical support and guide member, a switch mounted on said support and guide member in the path of sliding movement of said droppable element, said switch being in electrical circuit with said shutter tripping means and with a source of potential, so that when said switch is closed by the downward movement of said droppable element, the shutter is momentarily opened, said vertical support and guide member having a shielded portion provided with at least two substantially vertically aligned openings back of the shutter and in alignment with the shutter opening of the shutter when fully opened, said dropable element having at least two openings in substantially vertical alignment and in vertical alignment with the said openings in the said vertical support and guide member, said openings in the dropped element being provided with different light transmitting characteristics.

12. A testing equipment for photographic flashlamp synchronizers of the electromagnetic shutter-release type including, in combination, a vertical support and guide member provided with means for supporting a shutter and shutter tripping means, a source of illumination supported by said vertical support and guide member, a dropable element slidable downwardly in said vertical support and guide member, a switch mounted on said support and guide member in the path of sliding movement of said dropable element, said switch being in electrical circuit with said shutter tripping means and with a source of potential, so that when said switch is closed by the downward movement of said droppable element, the shutter is momentarily opened, said vertical support and guide member having a shielded portion provided with at least two substantially vertically aligned openings back of the shutter and in alignment with the shutter opening of the shutter when fully opened, said dropable element having three openings in substantially vertical alignment and in vertical alignment with said openings in the vertical support and guide member, said three openings being contrastingly colored.

JOSEPH A. SPRAGUE.

CERTIFICATE OF CORRECTION.

Patent No. 2,353,896. July 18, 1944.

JOSEPH A. SPRAGUE.

It is hereby certified that error appears in the printed specification of the above numbered patent requiring correction as follows: Page 9, first column, line 2, for the claim reference numeral "8" read --11--; and that the said Letters Patent should be read with this correction therein that the same may conform to the record of the case in the Patent Office.

Signed and sealed this 26th day of September, A. D. 1944.

Leslie Frazer (Seal)                          Acting Commissioner of Patents.